United States Patent
Dai et al.

(10) Patent No.: US 12,450,084 B2
(45) Date of Patent: Oct. 21, 2025

(54) SYSTEM AND OPERATION METHOD OF HYBRID VIRTUAL MACHINE MANAGERS

(71) Applicant: SAMSUNG ELECTRONICS CO., LTD., Suwon-si (KR)

(72) Inventors: Yuehua Dai, Xi'an (CN); Dongni Fan, Xi'an (CN); Qing Dai, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 17/901,257

(22) Filed: Sep. 1, 2022

(65) Prior Publication Data
US 2023/0067658 A1    Mar. 2, 2023

(30) Foreign Application Priority Data
Sep. 2, 2021   (CN) .......................... 202111026223.1

(51) Int. Cl.
| | |
|---|---|
| *G06F 3/00* | (2006.01) |
| *G06F 9/455* | (2018.01) |
| *G06F 9/50* | (2006.01) |
| *G06F 9/54* | (2006.01) |

(52) U.S. Cl.
CPC ........ *G06F 9/45558* (2013.01); *G06F 9/5044* (2013.01); *G06F 9/54* (2013.01)

(58) Field of Classification Search
CPC ...................................................... G06F 9/50
See application file for complete search history.

(56) References Cited

U.S. PATENT DOCUMENTS

| | | |
|---|---|---|
| 7,954,099 B2 | 5/2011 | Easton et al. |
| 8,327,353 B2 | 12/2012 | Traut |
| 8,447,935 B2 | 5/2013 | Gao et al. |
| (Continued) | | |

FOREIGN PATENT DOCUMENTS

| | | |
|---|---|---|
| CN | 101075198 A | 11/2007 |
| CN | 105765535 A | 7/2016 |
| (Continued) | | |

OTHER PUBLICATIONS

Takahiro Hirofuchi, RAMinate: Hypervisor-based Virtualization for Hybrid Main Memory Systems. (Year: 2016).*

(Continued)

*Primary Examiner* — Lechi Truong
(74) *Attorney, Agent, or Firm* — Morgan, Lewis & Bockius LLP (57) ABSTRACT

A system and method for operating a hybrid virtual machine manager are provided. The system includes a master virtual machine manager and one or more slave virtual machine managers, and the master virtual machine manager and the one or more slave virtual machine managers are different types of virtual machine managers. The master virtual machine manager is configured to allocate a first type of hardware resource and a second type of hardware resource to the slave virtual machine manager. The first type of hardware resource is a hardware resource capable of being directly operated by the slave virtual machine manager and is used exclusively by the slave virtual machine manager it is assigned to. The second type of hardware resource is a hardware resource that is managed by the master virtual machine manager.

17 Claims, 8 Drawing Sheets

(56) References Cited

U.S. PATENT DOCUMENTS

| | | | |
|---|---|---|---|
| 9,076,017 | B2 | 7/2015 | Addepalli et al. |
| 9,158,569 | B2 | 10/2015 | Mitra et al. |
| 9,218,489 | B2 | 12/2015 | Mooring et al. |
| 9,652,265 | B1 | 5/2017 | Narayanasamy et al. |
| 9,715,460 | B1 * | 7/2017 | Krasner ................. G06F 12/109 |
| 10,289,564 | B2 | 5/2019 | Hatta et al. |
| 10,963,290 | B2 | 3/2021 | Deguillard et al. |
| 11,016,798 | B2 | 5/2021 | Gopalan |
| 11,182,092 | B1 * | 11/2021 | Tsirkin ................. G06F 3/0647 |
| 11,836,515 | B2 * | 12/2023 | Hu ..................... G06F 9/45558 |
| 2011/0023030 | A1 * | 1/2011 | Lim ..................... G06F 9/5077 |
| | | | 718/1 |
| 2011/0179413 | A1 * | 7/2011 | Subramanian ...... G06F 9/45558 |
| | | | 718/1 |
| 2012/0110154 | A1 * | 5/2012 | Adlung ................ G06F 9/5077 |
| | | | 709/223 |
| 2013/0024862 | A1 | 1/2013 | Lim et al. |
| 2013/0298201 | A1 * | 11/2013 | Aravindakshan ..... H04L 69/164 |
| | | | 726/4 |
| 2014/0075439 | A1 * | 3/2014 | Wang .................... G06F 9/5077 |
| | | | 718/1 |
| 2014/0101657 | A1 * | 4/2014 | Bacher ................ G06F 9/45558 |
| | | | 718/1 |
| 2014/0282508 | A1 * | 9/2014 | Plondke ................ G06F 9/5016 |
| | | | 718/1 |
| 2015/0199217 | A1 * | 7/2015 | Shankar .................. G06F 7/588 |
| | | | 718/1 |
| 2015/0248357 | A1 * | 9/2015 | Kaplan ............... G06F 12/1408 |
| | | | 713/193 |
| 2016/0026489 | A1 * | 1/2016 | Maislos .............. G06F 9/45558 |
| | | | 718/1 |
| 2016/0092677 | A1 | 3/2016 | Patel et al. |
| 2016/0253200 | A1 | 9/2016 | Ma et al. |
| 2016/0277311 | A1 * | 9/2016 | Challa ..................... H04L 67/10 |
| 2018/0307517 | A1 * | 10/2018 | Devendran ........... G06F 9/5077 |

FOREIGN PATENT DOCUMENTS

| | | |
|---|---|---|
| CN | 106844007 A | 6/2017 |
| CN | 107710160 A | 2/2018 |

OTHER PUBLICATIONS

Diego Ongaro, Scheduling I/O in Virtual Machine Monitors. (Year: 2008).*

Saikishor Jangiti, Scalable hybrid and ensemble heuristics for economic virtual resource allocation in cloud and fog cyber-physical systems. (Year: 2018).*

Office Action dated Jun. 21, 2024 issued with corresponding Chinese Patent Application No. 202111026223.1.

* cited by examiner

SYSTEM AND OPERATION METHOD OF HYBRID VIRTUAL MACHINE MANAGERS

CROSS-REFERENCE TO RELATED APPLICATION

This application claims priority under 35 U.S.C. § 119 to Chinese Patent Application No. 202111026223.1, filed on Sep. 2, 2021, the disclosure of which is incorporated by reference herein in its entirety.

TECHNICAL FIELD

The invention relates to computer technology, more specifically, to a system and an operation method of hybrid virtual machine managers.

DISCUSSION OF THE RELATED ART

Virtualization refers to running a virtual instance of a computer system in a layer abstracted from the actual hardware. For example, several "virtual machines" may be run on a single host machine. Recent increased demand for safety, reliability, and scalability of servers and software has led to more and more embedded systems introducing virtualization technology.

Virtual systems often include a virtual machine manager (also referred to as a virtual machine controller). At present, virtual machine managers are typically divided into two categories, type 1 (type I) and type 2 (type II). Generally, the type 1 virtual machine manager has increased support for Device Passthrough and provides more efficient hardware resource utilization. The type 2 virtual machine manager may provide increased functionality and flexibility, especially under the current standardized implementation of a virtualization input and output interface. There may be more application scenarios for the type 2 virtual machine manager.

SUMMARY

The present disclosure provides a system and method for operating hybrid virtual machine managers.

Type I virtual machine managers may be better suited for single tasks, and have more efficient hardware utilization. Type II virtual machine managers may be run on a higher layer (e.g., "further from the metal") than Type I virtual machine managers, which may enable more functionality and adaptiveness to tasks at a cost to efficiency. There is a need, however, for a hybrid virtual machine manager that is both performant and adaptive.

According to one respect of the present invention, a hybrid virtual machine manager system is provided, and the system includes a master virtual machine manager and one or more slave virtual machine managers, and the master virtual machine manager and the one or more slave virtual machine manager(s) are different types of virtual machine managers. The master virtual machine manager is configured to allocate a first type of hardware resource and a second type of hardware resource to the slave virtual machine manager; the first type of hardware resource is a hardware resource capable of being directly operated by the slave virtual machine manager and used exclusively by the slave virtual machine manager it is assigned to; the second type of hardware resource is a hardware resource that is managed by the master virtual machine manager.

The master virtual machine manager may be configured to: generate a resource configuration table of the first type of hardware resource to the slave virtual machine manager when the master virtual machine manager is started; and provide, to the slave virtual machine manager, an interface table requesting the second type of hardware resource.

The resource configuration table may include address information for the first type of hardware. When the slave virtual machine manager requests the first type of hardware resource, the slave virtual machine manager is configured to directly operate the requested first type of hardware resource according to the address information of the requested first type of hardware resource in the resource configuration table.

The master virtual machine manager may further be configured to allocate a shared memory for the master virtual machine manager and the slave virtual machine manager to share event messages.

The interface table may include the second type of hardware resource and a corresponding operation interface, when the slave virtual machine manager requests the second type of hardware resource, the slave virtual machine manager is further configured to call the operation interface corresponding to the requested second type of hardware resource, write an event of the requested second type of hardware resource into the shared memory, and notify the master virtual machine manager through an inter processor interrupt (IPI) message; the master virtual machine manager is further configured to receive the IPI message sent by the slave virtual machine manager, read the event from the shared memory, determine the second type of hardware resource requested by the slave virtual machine manager by calling the interface table of the second type of hardware resource in the master virtual machine manager based on the event, and operate the requested second type of hardware resource; the master virtual machine manager calls the interface table, writes an event of an operation result of the requested second type of hardware resource to the shared memory, and notifies the slave virtual machine manager through an IPI message; the slave virtual machine manager is further configured to receive the IPI message sent by the master virtual machine manager, read the event of the operation result from the shared memory, and call the interface table of the second type of hardware resource in the slave virtual machine manager to obtain the operation result.

The event messages may include the operation state of the slave virtual machine manager managed by the master virtual machine manager.

The first type of hardware resource may include a central processing unit, a physical storage area, or other hardware resource that may be physically partitioned; and the second type of hardware resource includes an interrupt controller.

According to one respect of the present invention, a method operating a hybrid virtual machine manager is provided, and the hybrid virtual machine manager includes a master virtual machine manager and one or more slave virtual machine manager, and the master virtual machine manager and the slave virtual machine manager are different types of virtual machine managers. The method includes: allocating, by the master virtual machine manager, a first type of hardware resource and a second type of hardware resource to the slave virtual machine manager; where the first type of hardware resource is a hardware resource capable of being directly operated by the slave virtual machine manager and is used exclusively by the slave virtual machine manager it is allocated to; where the second type of hardware resource is a hardware resource that is managed by the master virtual machine manager.

The step of allocating, by the master virtual machine manager, the first type of hardware resource and the second type of hardware resource to the slave virtual machine manager may include: generating a resource configuration table of the first type of hardware resource to the slave virtual machine manager when the master virtual machine manager is started; and providing, to the slave virtual machine manager, an interface table requesting the second type of hardware resource.

The resource configuration table may include a reference to the first type of hardware resource and corresponding address information for the first type of hardware resource; where the method further includes: when the slave virtual machine manager requests the first type of hardware resource, directly operating, by the slave virtual machine manager, the requested first type of hardware resource according to the address information of the requested first type of hardware resource in the resource configuration table.

The method may further include: allocating, by the master virtual machine manager, a shared memory for the master virtual machine manager and the slave virtual machine manager to share event messages.

The interface table may include a reference to the second type of hardware resource and a corresponding operation interface, where the method further includes: when the slave virtual machine manager requests the second type of hardware resource, calling, by the slave virtual machine manager, the operation interface corresponding to the requested second type of hardware resource, writing an event of the requested second type of hardware resource into the shared memory, and notifying the master virtual machine manager through an inter processor interrupt (IPI) message; receiving, by the master virtual machine manager, the IPI message sent by the slave virtual machine manager, reading the event from the shared memory, determining the second type of hardware resource requested by the slave virtual machine manager by calling the interface table in the master virtual machine manager based on the event, and operating the requested second type of hardware resource; calling, by the master virtual machine manager, the interface table, writing an event of an operation result of the requested second type of hardware resource to the shared memory, and notifying the slave virtual machine manager through an IPI message; receiving, by the slave virtual machine manager, the IPI message sent by the master virtual machine manager, reading the event of the operation result from the shared memory, and calling the interface table of the second type of hardware resource in the slave virtual machine manager to obtain the operation result.

The event messages may include the operation state of the slave virtual machine manager that the master virtual machine manager manages.

The first type of hardware resource may include a central processing unit, a physical storage area, or other hardware resource that may be physically partitioned; and the second type of hardware resource may include at least an interrupt controller.

According to one respect of the present invention, a computer-readable storage medium storing a computer program is provided, which, when executed by a processor, implements any one method as described above.

In the virtual machine manager system according to an example embodiment of the present invention, the controls of the hardware by the master virtual machine manager and the slave virtual machine manager are isolated from each other by allocating the first type of hardware resource and the second type of hardware resource to the slave virtual machine manager using the master virtual machine manager, so as to provide parallel operation of the master virtual machine manager and the slave virtual machine manager under the same hardware privilege level without a hardware conflict, and to avoid the degradation of the performance of the system.

In the virtual machine manager system according to an example embodiment of the present invention, the master virtual machine manager may manage the operation state of the slave virtual machine manager. Therefore, the slave virtual machine manager may run with increased stability under the management of the master virtual machine manager.

In the virtual machine manager system according to an example embodiment of the present invention, since the master virtual machine manager and the slave virtual machine manager may communicate event messages about the operation state of the slave virtual machine manager by a shared memory, the master virtual machine manager may manage the operation state of the slave virtual machine manager with increased efficiency, and the virtual machine manager system may have increased stability.

In the virtual machine manager system according to the example embodiment of the present invention, since the master virtual machine manager and the slave virtual machine manager may identify a communication through an inter processor interruption and realize the communication through a shared memory, smooth and stable communication between the master virtual machine manager and the slave virtual machine manager may be ensured.

In the virtual machine manager system according to the example embodiment of the present invention, since an internal structure of the communication channel based on a shared memory may be implemented by a ring queue, the design of the communication channel may be simplified and have increased efficacy for the given resources.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

The following detailed description is provided to assist the reader in gaining a comprehensive understanding of the methods, apparatuses, and/or systems described herein. However, various changes and modifications may be made without departing from the scope of the present inventive concepts, and equivalents of the methods, apparatuses, and/or systems described herein will become apparent from the present disclosure. For example, the sequences of operations described herein are merely examples, and are not necessarily limited to those set forth herein, but may be changed as will be apparent after an understanding of the disclosure of this application, with the exception of operations necessarily occurring in a certain order. Like reference symbols in the drawings may denote like elements, and to the extent that a description of an element has been omitted, it may be understood that the element is at least similar to corresponding elements that are described elsewhere in the specification.

The features described herein may be embodied in different forms and are not necessarily limited to the examples described herein. Rather, the examples described herein have been provided to illustrate some of the many possible ways of implementing the methods, apparatuses, and/or systems described herein. Many of these possible implementations will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there may be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is used for describing various examples only and should not be construed in any limiting sense. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings.

Figure 1:
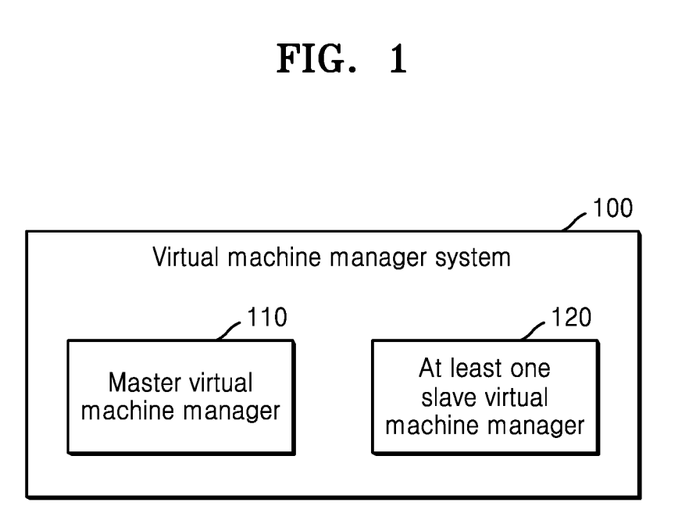
FIG. 1 is a block diagram of a system configured to operate hybrid virtual machine managers according to an example embodiment.

FIG. 1 is a block diagram of a system configured to support hybrid virtual machine managers according to an example embodiment.

Referring to FIG. 1, a system 100 (also referred to as a virtual machine manager system 100) configured to operate hybrid virtual machine managers according to an example embodiment may include a master virtual machine manager 110 and a slave virtual machine manager 120. The present disclosure is not limited to one slave virtual machine manager 120, and some embodiments may include two or more slave virtual machine managers 120.

Here, the hybrid virtual machine managers may include a plurality of virtual machine managers, and each virtual machine manager may run one or more virtual machines. For example, the master virtual machine manager 110 may run one or more first guest virtual machines and the slave virtual machine manager 120 may run one or more second guest virtual machines. For example, "hybrid" may refer to the virtual machine managers' ability to manage other virtual machine managers and/or other virtual machines of different types.

In one example, the master virtual machine manager 110 and the slave virtual machine manager 120 may be different types of virtual machine managers. For example, the master virtual machine manager 110 and the slave virtual machine manager 120 may be a master hypervisor and a slave hypervisor, respectively. As an example, the master virtual machine manager 110 may be a type 1 hypervisor (Type I Hypervisor), and the slave virtual machine manager 120 may be a type 2 hypervisor (Type II Hypervisor). However, the above are merely examples, and the present disclosure is not necessarily limited thereto.

In one embodiment, the master virtual machine manager 110 may allocate a first type of hardware resource and a second type of hardware resource to the slave virtual machine manager 120. For example, the hardware resource (s) that may be operated by the slave virtual machine manager 120 may be determined by the master virtual machine manager 110. In addition, the slave virtual machine manager 120 might not be able to independently change a range of the hardware resource that may be operated by the slave virtual machine manager 120. When there are multiple slave virtual machine managers 120, the master virtual machine manager 110 may allocate hardware resources of the first type and hardware resources of the second type to a plurality of virtual machine managers 120, respectively.

In a comparative example, when a virtual machine manager running at different hardware privilege levels than the main virtual machine manager requests hardware resources, it is necessary to operate the requested hardware resources through the main virtual machine manager after repeatedly trapping and forwarding the request instructions, which reduces the performance of the system. Further, if multiple virtual machine managers run at the same hardware privilege level, there are conflicts over the use of a hardware. In contrast, in a system according to the present disclosure, control of the hardware possessed by the master virtual machine manager 110 and control of hardware possessed by the slave virtual machine manager 120 are isolated from each other since the master virtual machine manager 110 allocates the first type of hardware resource and the second type of hardware resource to the slave virtual machine manager 120. Under this allocation structure, the operations of the master virtual machine manager 110 and the slave virtual machine manager 120 operate under the same hardware privilege level of the first type of hardware without a hardware conflict, so that the master virtual machine manager 110 and the slave virtual machine manager 120 can be operated in parallel without conflict and thereby prevent degradation of system performance.

For example, the first type of hardware resource may be a hardware resource that is directly operated by the slave virtual machine manager 120 and is not shared with other virtual machine managers. For example, the first type of hardware resource may be a hardware resource exclusive to the slave virtual machine manager 120.

In one example, the first type of hardware resource may include at least one central processing unit, a physical storage area, and/or other hardware resources that may be physically partitioned. In another example, the first type of hardware resource may include any exclusive peripheral hardware (e.g., a network card, a display device, and an audio device, etc.). However, the above are merely examples, and specifically, the first type of hardware resource that can be allocated may be determined according to the system design or the system hardware resources, and accordingly the present disclosure is not limited thereto.

The second type of hardware resource may be one or more hardware resources that need to be requested by the virtual machine manager 120 from the master virtual machine manager 110. For example, the second type of hardware resource may be a hardware resource used by the master virtual machine manager 110. For example, the second type of hardware resource may be one or more hardware resources shared by the master virtual machine manager 110 and the slave virtual machine manager 120.

In one example, the second type of hardware resource may be unique in the system and/or necessary for the execution of the master virtual machine manager 110 and the slave virtual machine manager 120 (for example, an interrupt controller in the system, or a power manager, etc.). In another example, the second type of hardware resource may include peripheral devices that need to be shared according to scene requirements. For example, virtual machines supported by the master virtual machine manager 110 and the slave virtual machine manager 120 may require a universal asynchronous receiver transmitter interface for a human-computer interaction, but this may be a limited resource, so it may be shared as a second hardware resource. As another example, a unique or limited graphics processor (GPU) may be needed to run in the virtual machines supported by the master virtual machine manager 110 and the slave virtual machine manager 120, so it may be shared as a second hardware resource.

After the master virtual machine manager 110 is started, the master virtual machine manager 110 may start the slave virtual machine manager 120 and allocate a central processing unit to the slave virtual machine manager 120, so that after an initialization, the slave virtual machine manager 120 obtains the first type of hardware resource (e.g., a resource unique to the slave virtual machine manager 120) and the second type of hardware resource running the slave virtual machine manager 120 (e.g., a resource shared between the slave virtual machine manager 120 and the master virtual machine manager 110, such as a processor). For example, the master virtual machine manager 110 may be started before the slave virtual machine manager 120 is started, and may control the start and an operation of the slave virtual machine manager 120. This will be described in more detail later in connection with FIG. 2.

When a second type of hardware resource is requested by the slave virtual machine manager 120, the master virtual machine manager 110 may receive a request from the slave virtual machine manager 120 through an inter processor interrupt manager. The master virtual machine manager 110 may process the request of the slave virtual machine manager 120, and the slave virtual machine manager 120 may operate the second type of hardware resource according to the result of the processing the request. In this way, a communication mechanism may be implemented between the master virtual machine manager 110 and the slave virtual machine manager 120 through the inter processor interrupt manager, so that the master virtual machine manager 110 may manage the slave virtual machine manager 120.

Figure 2:
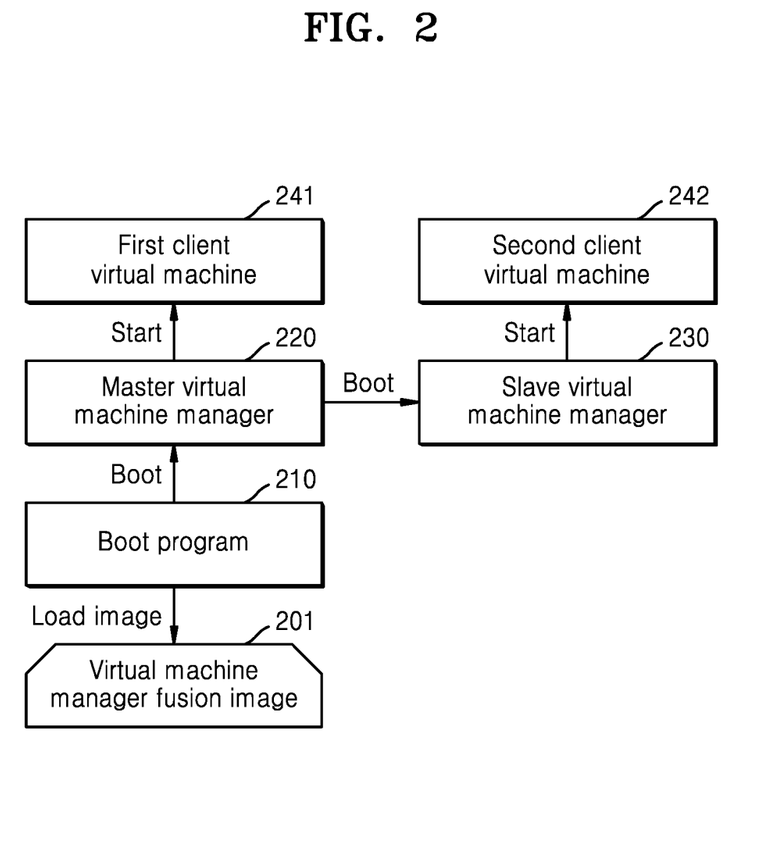
FIG. 2 is a schematic diagram of startup of a virtual machine manager system according to an example embodiment.

FIG. 2 is a schematic diagram of startup of a virtual machine manager system according to an example embodiment.

Referring to FIG. 2, after the virtual machine manager system is started, a boot program 210 of the virtual machine manager system may start the master virtual machine manager 220 by loading an image corresponding to the master virtual machine manager from a virtual machine manager fusion image 201. The master virtual machine manager 220 may initialize hardware resources (such as, but not limited to, a central processing unit (CPU), an interrupt controller, a memory, etc.) and divide the resources into master hardware resources and slave hardware resources according to the ownership of the runtime. For example, the ownership of the runtime may be configured or designed prior to startup or during startup.

Next, the master virtual machine manager 220 may initialize the master hardware resources required for its own operation. The master virtual machine manager 220 may also allocate slave hardware resources (e.g., first type of hardware resource and second type of hardware resource) to the slave virtual machine manager 230 according to a configuration file generated at the time of the division.

Resource configuration information received by the slave virtual machine manager 230 may include an address of the directly operable first type of hardware resource allocated thereto and an interface table of the second type of hardware resource. In addition, an interface table of the second type of hardware resource may be registered to the slave virtual machine manager 230 so that the second type of hardware resource, unable to be directly operated by the slave virtual machine manager 230, may be indirectly operated by the slave virtual machine manager 230 through the interface table of the second type of hardware resource.

In one example, the hardware resources allocated to each virtual machine manager can be preset by the system and can be loaded directly when each manager is started; and the hardware resources allocated to each virtual machine manager can also be allocated to each slave virtual machine manager in real time after the master virtual manager is started.

In an example operation, the master virtual machine manager 220 loads the program of the slave virtual machine manager 230 onto a slave resource (for example, a CPU allocated to the slave virtual machine manager 230), and the master virtual machine manager 220 may start the slave virtual machine manager 230 on the central processing unit of the slave resource. The master virtual machine manager 220 may synchronously start a client virtual machine (e.g., a first client virtual machine 241) on a master resource. The slave virtual machine manager 230 may initialize the slave resources required for an operation, for example, while the master virtual machine manager 220 is also initializing or running. The slave virtual machine manager 230 may start a client virtual machine (e.g., a second client virtual machine 242) on the slave resource. Finally, the master virtual machine manager 220 and the slave virtual machine manager 230 may run their respective client virtual machines synchronously on their respective resources. Accordingly, the parallel operations of the master virtual machine manager 220 and the slave virtual machine manager 230 may operate under the same hardware privilege level without a hardware conflict.

Figure 3:
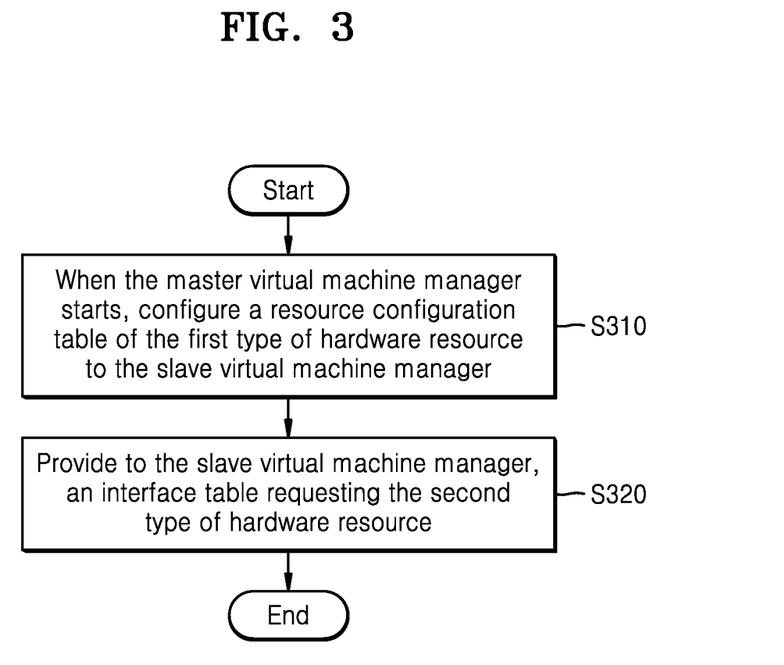
FIG. 3 is a flowchart of operations performed by the master virtual machine manager according to an example embodiment.

FIG. 3 is a flowchart of operations performed by the master virtual machine manager according to an example embodiment.

Referring to FIG. 3, in operation S310, when the master virtual machine manager starts, the master virtual machine manager may configure a resource configuration table of the first type of hardware resource to the slave virtual machine manager.

Here, the resource configuration table of the first type of hardware resource may indicate one or more hardware resources that can be directly operated by the slave virtual machine manager and are not shared by the master virtual machine manager. For example, the slave virtual machine manager can directly operate the first type of hardware resource according to the received resource configuration table of the first type of hardware resource. For example, the slave virtual machine manager may not need further permission to use or coordinate the use of the first type of hardware resource.

In operation S320, the master virtual machine manager may provide, to the slave virtual machine manager, an interface table requesting the second type of hardware resource.

For example, the second type of hardware resource can be operated by the slave virtual machine manager through the interface table of the second type of hardware resource. Therefore, the hardware resources available to the slave virtual machine manager may be expanded as needed.

In one embodiment, the master virtual machine manager may also allocate a shared memory for sharing event messages between the master virtual machine manager and the slave virtual machine manager. Accordingly, the slave virtual machine manager may run with increased stability under the management of the master virtual machine manager through the allocated shared memory. The following will be described in detail in connection with FIG. 4.

Figure 4:
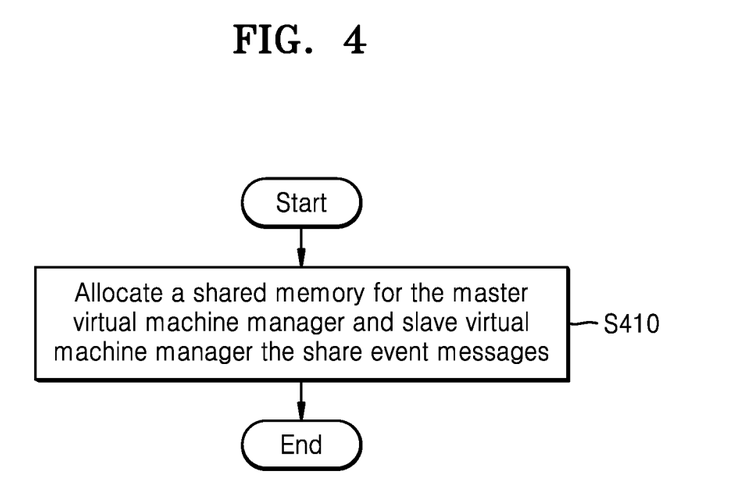
FIG. 4 is a flowchart of a method of allocation of a master virtual machine manager according to an example embodiment.

FIG. 4 is a flowchart of a method of allocation of a master virtual machine manager according to an example embodiment.

Referring to FIG. 4, in operation S410, the master virtual machine manager may allocate a shared memory for the master virtual machine manager and the slave virtual machine manager to share event messages.

Here, the shared memory may be a collection of multiple storage units shared by the master virtual machine manager with the slave virtual machine manager through an interface. For example, the shared memory may be partitioned and determined by the master virtual machine manager. In addition, the shared memory may be used to meet the communication requirements between the master virtual machine manager and the slave virtual machine manager and/or image buffer sharing.

For example, the master virtual machine manager may initially have access permissions to a global memory of the system. Next, the master virtual machine manager delegate different memory ranges accessible to the master virtual machine manager and the slave virtual machine manager. The master virtual machine manager may reserve a part of the memory range as the shared memory that may be operated by the slave virtual machine manager and the master virtual machine manager through the interface. The interface may also be called a shared memory interface. The shared memory interface may be initialized and called by the master virtual machine manager and the slave virtual machine manager, and may map the reserved shared memory. In addition, the master virtual machine manager and the slave virtual machine manager may achieve signal synchronization through the call of an optional lock interface, which may be a part of the shared memory interface.

Since the master virtual machine manager and the slave virtual machine manager may share event messages through the shared memory, the master virtual machine manager may efficiently manage the slave virtual machine manager so that the virtual machine manager systems run with increased stability. In one example, the event message may include the operation state of the slave virtual machine manager operated by master virtual machine manage. Therefore, the master virtual machine manager may efficiently manage the operation state of the slave virtual machine manager through the shared memory.

In one embodiment, the interface table may include a second type of hardware resource and a corresponding operation interface. When requesting a second type of hardware resource from the slave virtual machine manager, the slave virtual machine manager may call the operation interface corresponding to the requested second type of hardware resource, write an event of the requested second type of hardware resource to the shared memory, and notify the master virtual machine manager through an inter processor interrupt (IPI) message. Then, the master virtual machine manager may receive the IPI message sent by the slave virtual machine manager by an IPI manager, read the event from the shared memory, determine the second type of hardware resource requested by the slave virtual machine manager by calling the interface table of the second type of hardware resource in the master virtual machine manager according to the event, and operate the requested second type of hardware resource.

For example, the inter processor interrupt (IPI) message may be a message for transmitting whether an event exists between the master virtual machine manager and the slave virtual machine manager. The shared memory may be used to transfer events between the master virtual machine manager and the slave virtual machine manager. In one example, the event may include a request for a second type of hardware resource from the slave virtual machine manager and/or include information about the master virtual machine manager allowing the slave virtual machine manager to operate the second type of hardware resource. However, the above merely an example, and the events of the present disclosure are not necessarily limited thereto, and may be any event or message requiring a communication between the master virtual machine manager and the slave virtual machine manager.

Then, the master virtual machine manager may call the interface table, write an event of the operation result of the requested second type of hardware resource to the shared memory, and notify the slave virtual machine manager through an IPI message. The slave virtual machine manager may receive the IPI message sent by the master virtual machine manager, read the event of the operation result from the shared memory, and call the interface table of the second type of hardware resource in the slave virtual machine manager to obtain the operation result. Accordingly, through the above operations, the slave virtual machine manager may operate the second type of hardware resource under the management of the master virtual machine manager.

Figure 5:
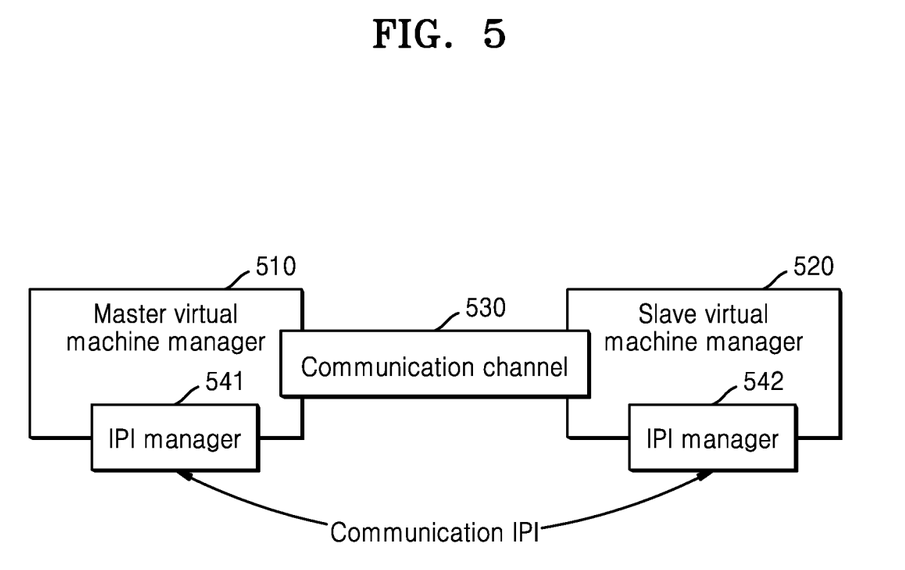
FIG. 5 is a schematic diagram of a communication between a master virtual machine manager and a slave virtual machine manager according to an example embodiment.

FIG. 5 is a schematic diagram of a communication between a master virtual machine manager and a slave virtual machine manager according to an example embodiment.

Referring to FIG. 5, a communication channel 530 may exist between the master virtual machine manager 510 and the slave virtual machine manager 520. The master virtual machine manager 510 and the slave virtual machine manager 520 may build a communication channel 530 for transmitting messages based on a shared memory.

In an example, the communication between the master virtual machine manager 510 and the slave virtual machine manager 520 may be asynchronous and may be realized through IPI managers 541 and 542 and a shared memory.

For example, the master virtual machine manager 510 and the slave virtual machine manager 520 may register communication message handlers for processing received messages. The master virtual machine manager 510 and the slave virtual machine manager 520 may agree on a specified inter processor interrupt number to identify the communication.

Since the master virtual machine manager 510 and the slave virtual machine manager 520 may identify the communication through an inter processor interruption and realize communication through a shared memory, smooth communication between the master virtual machine manager 510 and the slave virtual machine manager 520 may be ensured. As used herein, "smooth" may describe operations that have increased reliability, reduced or no interrupts in expected functionality, and/or efficient use of hardware or software resources.

In one example, the slave virtual machine manager 520 may write a message (e.g., an event message about the operation state of the slave virtual machine manager 520) to the communication channel 530. The master virtual machine manager 510 may receive the inter processor interrupt message from the IPI manager 542 through the inter processor interrupt (IPI) manager 541 and recognize the communication between the slave virtual machine manager 520 and the master virtual machine manager 510. In response to recognizing the communication between the slave virtual machine manager 520 and the master virtual machine manager 510, the master virtual machine manager 510 may read the message from the communication channel 530 and call a corresponding message handler to process the read message.

The master virtual machine manager 510 may write the result of the processing (for example, the processing result of the event message about the operation state of the slave virtual machine manager 520) to the communication channel 530. The master virtual machine manager 510 may send an inter processor interrupt message to the IPI manager 542 of the slave virtual machine manager 520 through the IPI manager 541. The slave virtual machine manager 520 may then identify the inter processor interrupt message received through the IPI manager 542 as the communication between the master virtual machine manager 510 and the slave virtual machine manager 520. In response to identifying the communication between the master virtual machine manager 510 and the slave virtual machine manager 520, the slave virtual machine manager 520 may read the message from the communication channel 530 and call the corresponding message handler to process the read message.

Although the message from the above example is described as an event message about the operation state of the slave virtual machine manager 520 in the above example, the message communicated between the master virtual machine manager 510 and the slave virtual machine manager 520 of the present disclosure is not necessarily limited thereto. The message communicated between the master virtual machine manager 510 and the slave virtual machine manager 520 may be any other message (e.g., a message requesting data, a message requesting an address, etc.).

The communication channel based on a shared memory and the corresponding communication mechanism are described in more detail below with reference to FIGS. 6 and 7.

Figure 6:
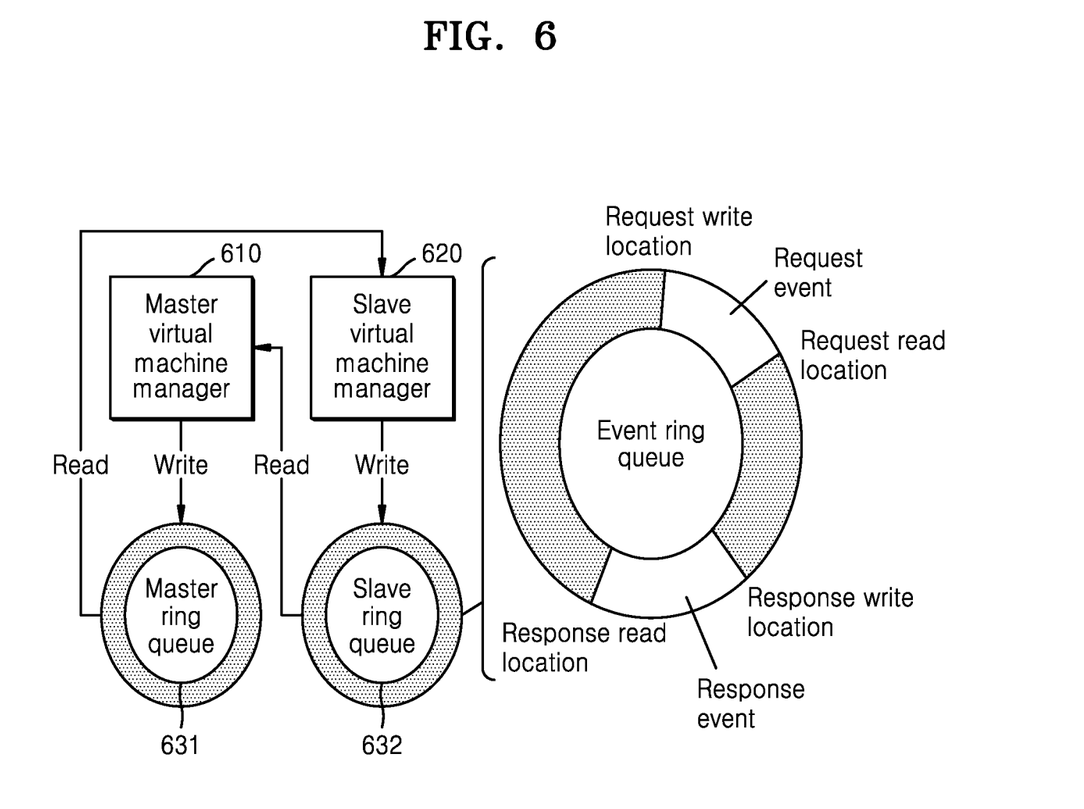
FIG. 6 is a schematic diagram of a communication through a shared memory based communication channel according to an example embodiment.

FIG. 6 is a schematic diagram of a communication through a shared memory based communication channel according to an example embodiment. FIG. 7 is a timing diagram of a communication mechanism based on FIG. 6 of a master virtual machine manager and a slave virtual machine manager according to the example embodiment.

Referring to FIG. 6, the internal structure of a shared memory based communication channel according to an example embodiment of the present disclosure may be implemented using a ring queue. Because the ring queue is used to realize the shared memory based communication channel, the design of the communication channel may be simplified and have increased efficiency.

Figure 7:
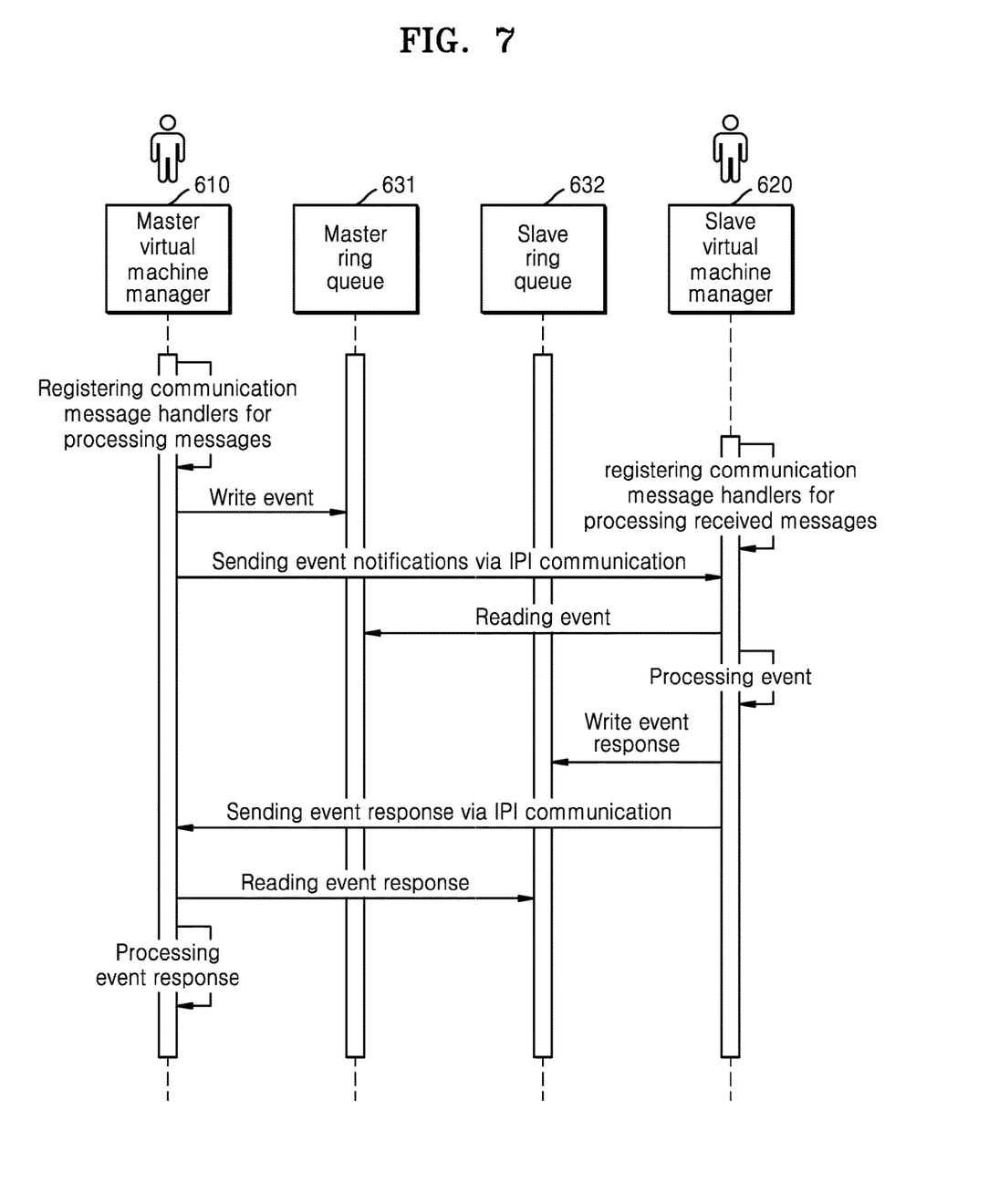
FIG. 7 is a timing diagram of a communication mechanism based on FIG. 6 of a master virtual machine manager and a slave virtual machine manager according to the example embodiment.

For example, in combination with FIGS. 6 and 7, the master virtual machine manager 610 and the slave virtual machine manager 620 may register their respective communication message handlers for processing messages. The master virtual machine manager 610 may write information (or events) to a master ring queue 631 corresponding to the master virtual machine manager 610, and may send event notifications to the slave virtual machine manager 620 via an IPI communication.

In response to receiving the event notification, the slave virtual machine manager 620 may read messages from the master ring queue 631 corresponding to the master virtual machine manager 610 and process the read messages. Then, the slave virtual machine manager 620 may write a message (e.g., the result of processing the read message, or an event response) to a slave ring queue 632 corresponding to the slave virtual machine manager 620, and may send an event response notification to the master virtual machine manager 610 via the IPI communication. The master virtual machine manager 610 may read messages (or event responses) from the slave ring queue 632 corresponding to the slave virtual machine manager 620. After that, the master virtual machine manager 610 may process the read message.

In an example, the master ring queue 631 and the slave ring queue 632 may have a structure corresponding to the event ring queue as shown in the right part of FIG. 6. The event ring queue may include a request write location, a request event, a request read location, a response write location, a response event, and/or a response read location.

Figure 8:
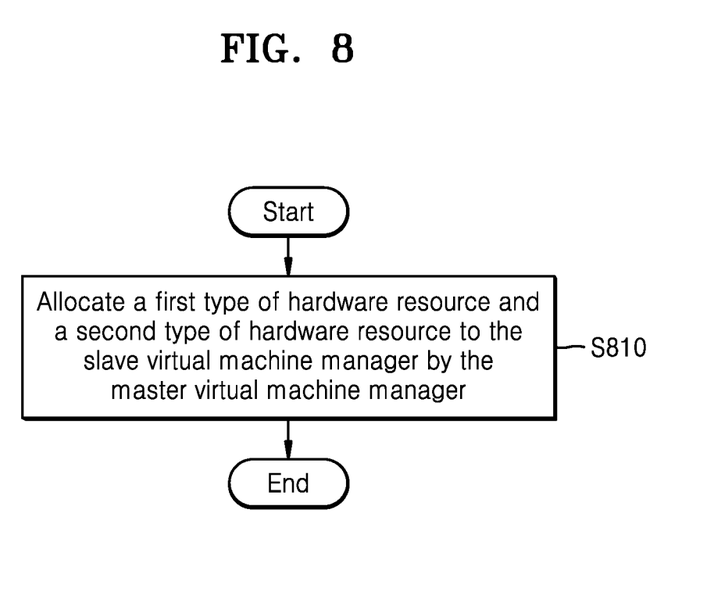
FIG. 8 illustrates a method of an operation of hybrid virtual machine managers according to an example embodiment.

FIG. 8 illustrates a method of an operation of hybrid virtual machine managers according to an example embodiment.

Referring to FIG. 8, in operation S810, the virtual machine manager system may allocate a first type of hardware resource and a second type of hardware resource to the slave virtual machine manager by the master virtual machine manager.

A method of operating of hybrid virtual machine managers according to the present disclosure may include one or more of operations performed by the master virtual machine manager and one or more operations performed by the slave virtual machine manager described with reference to at least one of FIGS. 1 to 7. In addition, the master virtual machine manager, the slave virtual machine manager, the first type of hardware resource and the second type of hardware resource may be the master virtual machine manager, the slave virtual machine manager, the first type of hardware resource and the second type of hardware resource described with reference to at least one of FIGS. 1 to 7, respectively. Therefore, for simplicity, the redundant description of the master virtual machine manager, the slave virtual machine manager, the first type of hardware resource and the second type of hardware resource may be omitted from the following description.

In the virtual machine manager system according to an example embodiment of the present disclosure, the controls of the hardware by the master virtual machine manager and the slave virtual machine manager are isolated from each other by allocating the first type of hardware resource and the second type of hardware resource to the slave virtual machine manager using the master virtual machine manager, so as to enable the parallel operation of the master virtual machine manager and the slave virtual machine manager under the same hardware privilege level without a hardware conflict, and to prevent degradation of performance of the system.

In the virtual machine manager system according to an example embodiment of the present disclosure, the master virtual machine manager may manage the operation state of the slave virtual machine manager. Therefore, the slave virtual machine manager may run with increased stability under the management of the master virtual machine manager.

In the virtual machine manager system according to an example embodiment of the present disclosure, since the master virtual machine manager and the slave virtual machine manager may communicate event messages about, for example, the operation state of the slave virtual machine manager by a shared memory, the master virtual machine manager may efficiently manage the operation state of the slave virtual machine manager, so that the virtual machine manager system runs with increased stability.

In the virtual machine manager system according to the example embodiment of the present disclosure, since the master virtual machine manager and the slave virtual machine manager may identify a communication through an inter processor interruption and realize the communication through a shared memory, a smooth communication between the master virtual machine manager and the slave virtual machine manager may be ensured.

In the virtual machine manager system according to the example embodiment of the present disclosure, since an internal structure of a shared memory based communication channel may be implemented by a ring queue, the design of the communication channel may be simplified and have increased efficiency.

According to one or more example embodiments, the above-described processor may be implemented using a combination of hardware, hardware and software, or a non-transitory storage medium configured to store executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is compiled to produce the machine code and/or executed using an interpreter.

For example, when a hardware device is a computer processing device (e.g., one or more processors, CPUs, controllers, ALUs, DSPs, microcomputers, microprocessors, etc.), the computer processing device may be configured to execute program code by performing arithmetical, logical, and input/output operations, according to the program code. Once the program code is loaded into a computer processing device, the computer processing device may be configured to execute the program code, thereby transforming the computer processing device into a special purpose computer processing device. In an example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be implemented in one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors, or multiple servers/computers connected by a network.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent and/or non-volatile mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or combination thereof, may also be loaded into the one or more storage devices and/or the one or more computer processing devices from a remote data storage device via a network interface. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of implementing embodiments of the present disclosure.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the present inventive concepts. Accordingly, all such modifications are intended to be included within the scope of example embodiments of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A hybrid virtual machine manager system, the system comprising:
   a master virtual machine manager including a processor and memory; and
   one or more slave virtual machine managers each including a processor and memory, wherein the master virtual machine manager and the one or more slave virtual machine managers are of different types;
   wherein the master virtual machine manager is configured to allocate a first type of hardware resource and a second type of hardware resource to the one or more slave virtual machine managers;
   wherein the first type of hardware resource is a hardware resource capable of being directly operated by the one or more slave virtual machine managers, and is used exclusively by the slave virtual machine manager it is allocated to such that it is not shared with other slave virtual machine managers; and
   wherein the second type of hardware resource is a hardware resource that is managed by the master virtual machine manager; and
   wherein the master virtual machine manager is configured to:
     generate a resource configuration table of the first type of hardware resource to the one or more slave virtual machine managers when the master virtual machine manager is started; and
     provide, to the one or more slave virtual machine managers, an interface table for requesting the second type of hardware resource.

2. The system according to claim 1, wherein the resource configuration table includes address information for the first type of hardware resource;
   and wherein when the one or more slave virtual machine managers requests the first type of hardware resource, the one or more slave virtual machine managers is configured to directly operate the requested first type of hardware resource according to the address information of the requested first type of hardware resource in the resource configuration table.

3. The system according to claim 1, wherein the master virtual machine manager is further configured to allocate a shared memory for the master virtual machine manager and the one or more slave virtual machine managers to share event messages.

4. The system according to claim 3, wherein, the interface table includes a reference to the second type of hardware resource and a corresponding operation interface,
   when the one or more slave virtual machine managers requests the second type of hardware resource, the one or more slave virtual machine managers is further configured to call the operation interface corresponding to the requested second type of hardware resource, write an event of the requested second type of hardware resource into the shared memory, and notify the master virtual machine manager through an inter processor interrupt (IPI) message;
   wherein the master virtual machine manager is further configured to receive the IPI message sent by the one or more slave virtual machine managers, read the event from the shared memory, determine the second type of hardware resource requested by the one or more slave virtual machine managers by calling the interface table of the second type of hardware resource in the master virtual machine manager based on the event, and operate the requested second type of hardware resource;

wherein, the master virtual machine manager calls the interface table, writes an event of an operation result of the requested second type of hardware resource to the shared memory, and notifies the one or more slave virtual machine managers through an IPI message;

and wherein the one or more slave virtual machine managers is further configured to receive the IPI message sent by the master virtual machine manager, read the event of the operation result from the shared memory, and call the interface table of the second type of hardware resource in the one or more slave virtual machine managers to obtain the operation result.

5. The system according to claim 3, wherein the event messages include an operation state of the one or more slave virtual machine managers managed by the master virtual machine manager.

6. The system according to claim 1, wherein the first type of hardware resource includes a central processing unit, a physical storage area, or other hardware resource that may be physically partitioned; and the second type of hardware resource includes an interrupt controller.

7. A method of operating a hybrid virtual machine manager, the hybrid virtual machine manager including a master virtual machine manager and one or more slave virtual machine managers, the method including:

allocating, by the master virtual machine manager, a first type of hardware resource and a second type of hardware resource to the one or more slave virtual machine managers;

wherein the master virtual machine manager and the one or more slave virtual machine managers are types of virtual machine managers;

wherein the first type of hardware resource is a hardware resource capable of being directly operated by the one or more slave virtual machine managers and is used exclusively by the slave virtual machine manager it is allocated to such that it is not shared with other slave virtual machine managers;

wherein the second type of hardware resource is a hardware resource that is managed by the master virtual machine manager; and wherein the allocating, by the master virtual machine manager, the first type of hardware resource and the second type of hardware resource to the one or more slave virtual machine managers includes:

generating a resource configuration table of the first type of hardware resource to the one or more slave virtual machine managers when the master virtual machine manager is started; and providing, to the one or more slave virtual machine managers, an interface table requesting the second type of hardware resource.

8. The method according to claim 7, wherein the resource configuration table includes a reference to the first type of hardware resource, and further includes corresponding address information for the first type of hardware resource;

wherein the method further includes: when the one or more slave virtual machine managers requests the first type of hardware resource, directly operating, by the one or more slave virtual machine managers, the requested first type of hardware resource according to the address information of the requested first type of hardware resource in the resource configuration table.

9. The method according to claim 7, wherein the method further includes: allocating, by the master virtual machine manager, a shared memory for the master virtual machine manager and the one or more slave virtual machine managers to share event messages.

10. The method according to claim 9, wherein, the interface table includes a reference to the second type of hardware resource and a corresponding operation interface, wherein the method further includes:

when the one or more slave virtual machine managers requests the second type of hardware resource, calling, by the one or more slave virtual machine managers, the operation interface corresponding to the requested second type of hardware resource, writing an event of the requested second type of hardware resource into the shared memory, and notifying the master virtual machine manager through an inter processor interrupt (IPI) message;

receiving, by the master virtual machine manager, the IPI message sent by the one or more slave virtual machine managers, reading the event from the shared memory, determining the second type of hardware resource requested by the one or more slave virtual machine managers by calling the interface table of the second type of hardware resource in the master virtual machine manager based on the event, and operating the requested second type of hardware resource;

calling, by the master virtual machine manager, the interface table, writing an event of an operation result of the requested second type of hardware resource to the shared memory, and notifying the one or more slave virtual machine managers through an IPI message;

receiving, by the one or more slave virtual machine managers, the IPI message sent by the master virtual machine manager, reading the event of the operation result from the shared memory, and calling the interface table in the one or more slave virtual machine managers to obtain the operation result.

11. The method according to claim 9, wherein the event messages include an event message with operation state information that allows the master virtual machine manager to manage an operation state of the one or more slave virtual machine managers.

12. The method according to claim 7, wherein the first type of hardware resource includes a central processing unit, a physical storage area, or other hardware resource that may be physically partitioned; and the second type of hardware resource at least includes an interrupt controller.

13. A tangible, non-transitory computer-readable storage medium storing a computer program, which, when executed by a processor, implements a method of operating a hybrid virtual machine manager, the hybrid virtual machine manager including a master virtual machine manager and one or more slave virtual machine managers, the method including:

allocating, by the master virtual machine manager, a first type of hardware resource and a second type of hardware resource to the one or more slave virtual machine managers;

wherein the master virtual machine manager and the one or more slave virtual machine managers are different types of virtual machine managers;

wherein the first type of hardware resource is a hardware resource capable of being directly operated by the one or more slave virtual machine managers and is used exclusively by the slave virtual machine manager it is allocated to such that it is not shared with other slave virtual machine managers;

wherein the second type of hardware resource is a hardware resource that is managed by the master virtual machine manager; and wherein the allocating, by the master virtual machine manager, the first type of hardware resource and the second type of hardware resource to the one or more slave virtual machine managers includes;

generating a resource configuration table of the first type of hardware resource to the one or more slave virtual machine managers when the master virtual machine manager is started; and providing, to the one or more slave virtual machine managers, an interface table requesting the second type of hardware resource.

14. The computer-readable storage medium of claim 13, wherein the resource configuration table includes a reference to the first type of hardware resource, and further includes corresponding address information for the first type of hardware resource;

and wherein the method implemented by the computer-readable storage medium further includes, when the one or more slave virtual machine managers requests access to the first type of hardware resources, directly operating, by the one or more slave virtual machine managers, the requested first type of hardware resource according to the address information of the requested first type of hardware resource in the resource configuration table.

15. The computer-readable storage medium of claim 13, wherein the method implemented by the computer-readable storage medium further includes:

allocating, by the master virtual machine manager, a shared memory for the master virtual machine manager and the one or more slave virtual machine managers to share event messages.

16. The computer-readable storage medium of claim 15, wherein the interface table includes a reference to the second type of hardware resource and a corresponding operation interface, wherein the method implemented by the computer readable storage medium further includes:

when the one or more slave virtual machine managers requests the second type of hardware resource, calling, by the one or more slave virtual machine managers, the operation interface corresponding to the requested second type of hardware resource, writing an event of the requested second type of hardware resource into the shared memory, and notifying the master virtual machine manager through an inter processor interrupt (IPI) message;

receiving, by the master virtual machine manager, the IPI message sent by the one or more slave virtual machine managers, reading the event from the shared memory, determining the second type of hardware resource requested by the one or more slave virtual machine managers by calling the interface table of the second type of hardware resource in the master virtual machine manager based on the event, and operating the requested second type of hardware resource;

calling, by the master virtual machine manager, the interface table, writing an event of an operation result of the requested second type of hardware resource to the shared memory, and notifying the one or more slave virtual machine managers through an IPI message;

receiving, by the one or more slave virtual machine managers, the IPI message sent by the master virtual machine manager, reading the event of the operation result from the shared memory, and calling the interface table in the one or more slave virtual machine managers to obtain the operation result.

17. The computer-readable storage medium of claim 15, wherein the event messages include an event message with operation state information that allows the virtual machine manager to manage an operation state of the one or more slave virtual machine managers.

\* \* \* \* \*